Aug. 28, 1928.
A. G. MOLNIAR
HAND SYMBOL SIGNAL
Filed May 18, 1927
1,682,233
2 Sheets-Sheet 1
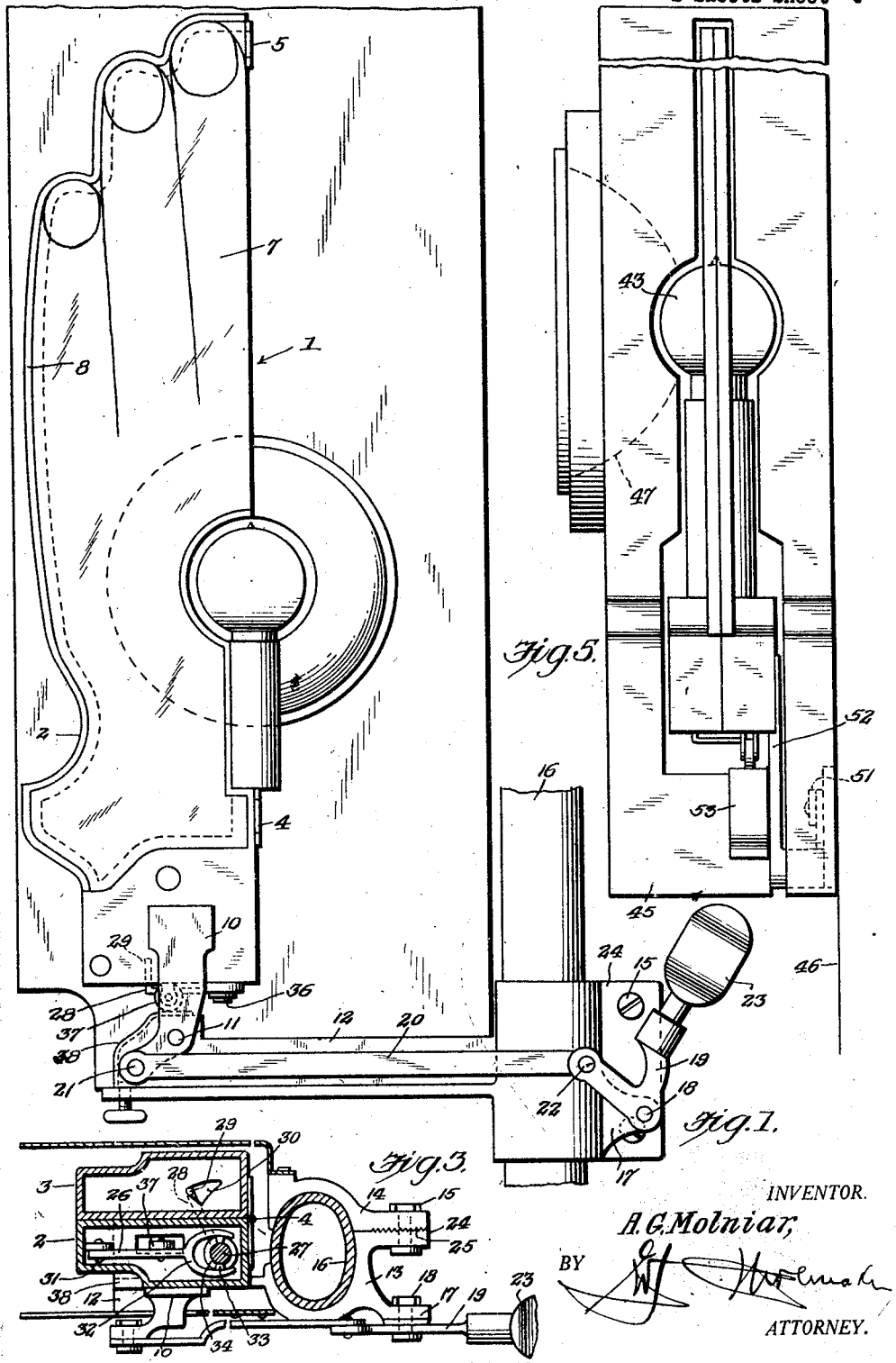
INVENTOR.
A.G. Molniar,
BY
ATTORNEY.

Aug. 28, 1928.  1,682,233
A. G. MOLNIAR
HAND SYMBOL SIGNAL
Filed May 18, 1927     2 Sheets-Sheet 2
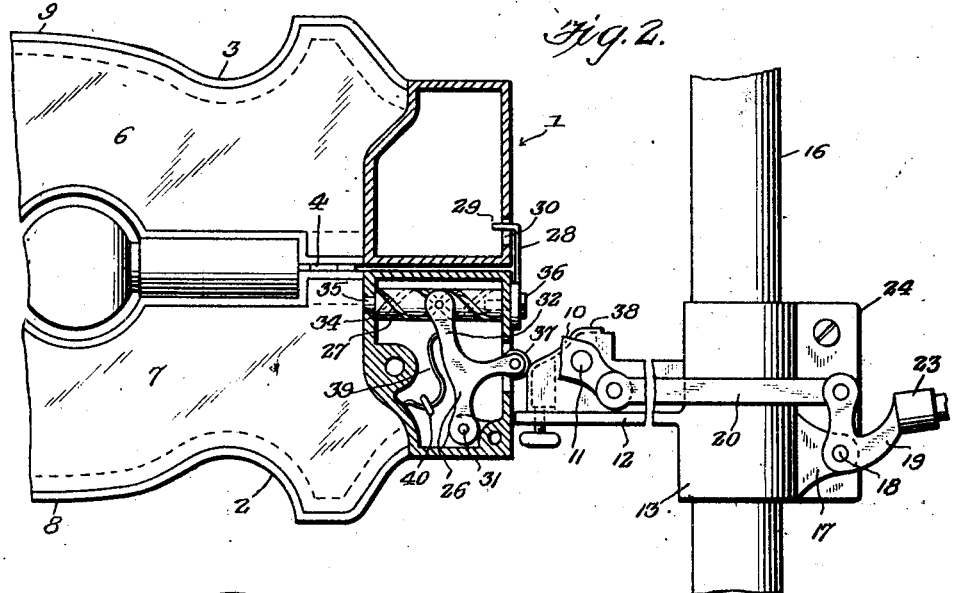
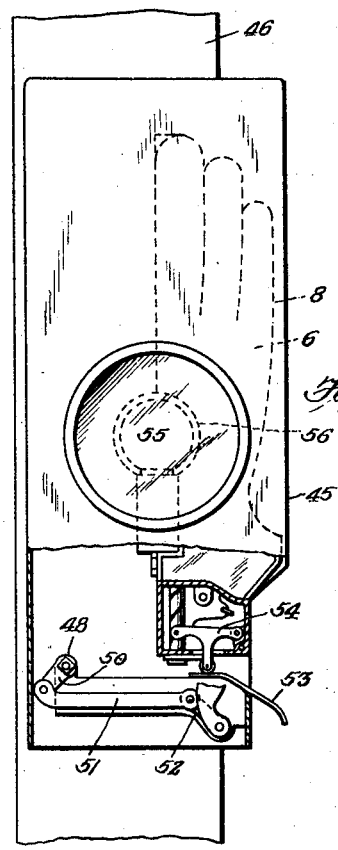
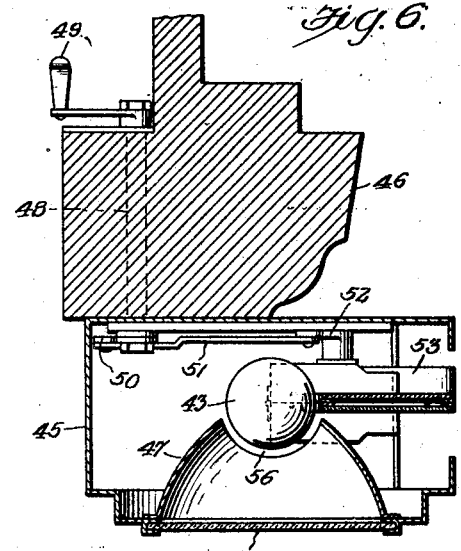
INVENTOR:
A. G. Molniar,
BY
ATTORNEY.

Patented Aug. 28, 1928.

1,682,233

UNITED STATES PATENT OFFICE.

ALBERT GEORGE MOLNIAR, OF ALBION, MICHIGAN.

HAND-SYMBOL SIGNAL.

Application filed May 18, 1927. Serial No. 192,410.

The invention relates to a hand symbol signal for automobiles and other motor vehicles.

The object of the present invention is to provide a simple, practical and efficient hand symbol signalling device of strong, durable, and comparatively inexpensive construction adapted to be easily and cheaply manufactured and installed on automobiles and other motor vehicles at a low cost and capable of imitating an outstretched hand for signalling and of convenient operation interiorly of a car at a point adjacent the steering wheel.

A further object of the invention is to provide a practical and efficient automobile signal of this character adapted to fold compactly within a relatively small space when not in signalling position and capable of unfolding and swinging to a signalling position and of displaying a light both at the front and rear, whereby the signal will be effective both day and night.

Another object of the invention is to provide an automobile signal equipped with a spotlight and operable to carry an electric light bulb with it from the spotlight to a signalling position and capable of returning the electric light to the spotlight when the automoblie signal is swung to its non-signalling position.

Another object of the invention is to provide an automobile hand symbol signal equipped with a spotlight and adapted for use on open and closed cars and capable of instant operation with a single motion to move the device to signalling position or to return it to non-signalling spotlight position without unbuttoning curtains or opening a window of a closed car or otherwise exposing the occupants of the car to the weather and thereby afford practical safety signalling and spotlight service from the interior of a machine.

With these and other objects in view, the invention consists in the construction and novel combination and arrangement of parts hereinafter described, illustrated in the accompanying drawings, and set forth in the claims hereto appended, it being understood that various changes in the form, size, and minor details of construction, within the scope of the claims, may be resorted to without departing from the spirit of the invention or sacrificing any of the advantages thereof.

In the drawings:

Figure 1 is a side elevation of an automobile hand symbol signal constructed in accordance with this invention and shown in non-signalling position, one side of the casing or covering being removed and the device being shown applied to the corner post of an open car.

Fig. 2 is a similar view, the device being in signalling position.

Fig. 3 is a horizontal sectional view of the same.

Fig. 4 is an elevation of an automobile hand signal shown applied to a portion of a closed car.

Fig. 5 is an edge view of the same partly in section, the signal being folded.

Fig. 6 is a horizontal sectional view of the device shown in Figs. 4 and 5, the signal being folded.

In the accompanying drawings, in which are illustrated the preferred embodiments of the invention, the automobile hand symbol signal comprises in its construction a signal element 1 which is preferably in the form of a hand but which may be of any other preferred configuration. The signal element is composed of two foldable sections 2 and 3 connected together by suitable hinges 4 and 5 and composed of metallic portions and portions 6 and 7 of glass, celluloid or other suitable material which may be readily molded or otherwise shaped into the form of a hand. The metallic portions have extensions 8 and 9 forming a marginal frame around the outer edges of the portions 6 and 7 and supporting the same. The metallic portions of the device may also be readily punched or cast and the signal element may take the form of an arrow, star, or other form. The hinges 4 and 5 which connect the sections 2 and 3 enable the sections to fold together in compact arrangement when the signal element is moved to non-signalling position, and this is effected automatically by the means hereinafter described. The signal element is adapted to swing downward from a vertical folded position to a horizontal signalling position and the sections unfold during such downward swinging movement and they fold together when the signal element is swung upward from a horizontal signalling position to a vertical non-signalling position.

The section 2 of the signal element is rigidly connected to one arm of a lever 10 fulcrumed intermediate of its ends on a horizontal pivot 11 carried by a bracket arm 12 of a section 13 of a clamp composed of the said section 13 and a section 14 and connecting bolts 15. The clamp is provided with jaws which conform to the configuration of the rigid corner post 16 of an automobile of the open type. The supporting or bracket arm 12 extends outwardly from the outer portion of the jaw 13 which is provided at its inner portion with a bracket arm 17 carrying a pivot 18 which forms a fulcrum and an operating lever 19. The lever 10 consists of a relatively long arm and a short angularly related arm which is connected with the operating lever by a link 20. The link 20 is connected to the levers 10 and 19 by suitable pivots 21 and 22, and the operating lever, which is approximately V-shaped, is fulcrumed at its angle and has one arm connected to the said link 20 and is provided at its other arm with a projecting handle 23 located at the inner side of the corner post 16. When the operating lever is oscillated motion will be communicated to the lever 12 and the signal element will be swung on the pivot 11 of the lever 10 to carry the signal element into and out of a cover or casing and from a vertical non-signalling position to a horizontal signalling position and back to a vertical position within the cover or casing for concealing the signal element. The sections 13 and 14 of the clamp are provided with inwardly projecting webs or flanges 24 which are pierced by the adjusting bolts 15 and which have inner corrugated faces 25.

The opening and closing of the hinged sections of the signal element is effected automatically during the swinging movement of the signal element. This is accomplished by mechanism comprising a cam actuated spring pressed lever 26 and a worm or screw shaft 27 extending longitudinally of the section 2 of the signal element and journaled in suitable bearings and provided with an oscillatory arm 28 arranged exteriorly of the sections of the signal element and provided with a terminal lug 29 which engages in a slot 30 in the inner end of the foldable section 3. The lever, which is approximately T-shaped is composed of aligned arms and a laterally extending arm. One of the aligned arms is fulcrumed at its outer end by a suitable pivot 31 to the section 2 of the signal element and the other aligned arm has a fork or bifurcation 32 provided at its sides with inwardly extending rounded lugs 33 which engage spiral grooves 34 of the shaft 27 whereby when the lever 26 is oscillated the shaft 27 will be rotated. The shaft 27 which is disposed longitudinally of the section 2 of the signal element is provided at one end with a journal 35 and at its other end is suitably journaled in the section 2 by means of a screw 36 which also secures the arm 28 to the shaft 27. The laterally extending arm of the lever 26 is provided with a wheel 37 which is arranged to roll on a cam 38 and which is maintained in engagement with the same by a spring 39. The spring 39, which is suitably mounted in the section 2 of the signal element by spaced lugs 40 bears against the back of the cam actuated lever and the cam preferably consists of a bent plate having an inclined portion and mounted on the bracket arm 12 of the section 13 of the clamp. The wheel of the lever 26 rolls up and down the incline of the cam when the signal element is swung on its pivot and the worm or screw shaft is rotated by the swinging movement of the lever 26 to swing the section 3 of the signal element to open and close the latter. The cam forces the lever 26 in one direction and the spring swings the lever in the opposite direction, so that there is a positive rotation of the worm or screw shaft during the swinging movement of the signal element. The bent plate which forms the cam is suitably secured at its upper end to the bracket arm 12 and is connected at its upper end with an adjusting screw 41 for varying the cam action, but any other suitable form of adjustable cam may, of course, be employed. When the signal element is swung upward to its vertical position the sections 2 and 3 are closed and the signal element is carried within the concealing covering, which may consist of spaced sides 42 secured to the bracket arm 12 at opposite sides thereof. The cover may be constructed of any suitable material and it may, as hereinafter described, be equipped at the fold with a spotlight reflector to enable an electric light bulb 43 to function as a signal light and also as a spotlight. The section 2 is provided with an electric light socket 44 which may be arranged in any suitable circuit and any suitable means may be provided for automatically opening the circuit when the signalling arm is moved to its non-signalling position and for closing the same when it is moved to signalling position.

When the automobile hand symbol signal is mounted on a closed car, as illustrated in Figs. 4 to 6, inclusive, a suitable casing 45 is employed and is suitably secured to the frame 46 of the body of the machine at the left hand corner thereof. The casing is designed to be equipped at the front with a spotlight reflector 47 and the electric light bulb is carried to a position adjacent the spotlight reflector when the signal element is folded or moved to non-signalling position. The casing 45 is open at the outer side to permit the signal element to swing into and out of the same and the covering shown in Figs. 1 to 3 inclusive is also open at the outer side for that purpose. In this form of the invention the operating lever is preferably in the form of a horizontal shaft 48 suitably journaled in the frame 46 in the body of the car and is provided at its inner end with a crank handle 49 and at its outer end with an arm 50 which is connected by a link 51 with the lever 52 which carries the signal element. The signal element is constructed substantially the same as that heretofore described, and a suitable cam 53 is provided for actuating the T-shaped lever 54. The operation of the automobile signal illustrated in Figs. 4 to 6, inclusive, is the same as that heretofore described. The crank handle 49 is within easy reach of the driver of the machine and the signal be moved to each of its positions by a single movement of the operating lever formed by the shaft 48 and its arms 49 and 50. The front side of the covering shown in Figs. 1 to 3, inclusive, may, of course, be provided with a spotlight casing so that the electric light will function both as a spotlight and as a signal light. The spotlight reflector is equipped with a spotlight glass 55 and may be of any desired construction, as will be readily understood. The electric light bulb 43 is arranged in corresponding registering recesses 56 of the sections of the signal element. The recesses form an opening in the signal element for displaying the electric light at both the front and rear.

What I claim is:

1. An automobile signal of the class described, including a signal element divided longitudinally to form two sections, said sections being hinged together at their inner longitudinal edges to permit one of the sections to swing transversely and fold against the other section, means for moving the signal bodily to and from a signalling position, and means for folding and unfolding the sections of the signal element during the movement of the same to and from the said signalling position.

2. An automobile signal of the class described, including a signal element divided longitudinally to form two sections, said sections being hinged together at their inner longitudinal edges to permit one of the sections to swing transversely and fold against the other section, means for pivotally mounting the signal element and for swinging the same to and from a signalling position, and means for folding and unfolding the hinged sections of the signal element during the swinging movements of the latter.

3. An automobile signal of the class described, including a signal element divided longitudinally to form two sections, said sections being hinged together at their inner longitudinal edges to permit one of the sections to swing transversely and fold against the other section, means for pivotally mounting the signal element and for swinging the same to and from a signalling position, and means for folding and unfolding the hinged sections of the signal element during the swinging movements of the latter, the latter means including a shaft mounted on one of the sections and having an arm connected with the other section, a relatively fixed cam and means carried by the signal element and engaged by the cam for rotating the shaft.

4. An automobile signal of the class described, including a signal element divided longitudinally to form two sections, said sections being hinged together at their inner longitudinal edges to permit one of the sections to swing transversely and fold against the other section, means for pivotally mounting the signal element and for swinging the same to and from a signalling position, and means for folding and unfolding the hinged sections of the signal element during the swinging movements of the latter, the latter means including a shaft mounted on one of the sections and having an arm connected with the other section, a relatively fixed cam and means carried by the signal element and engaged by the cam for rotating the shaft in one direction and a spring for rotating the shaft in the opposite direction.

5. An automobile signal of the class described, including a signal element composed of hinged foldable sections, means for pivotally mounting the signal element and for swinging the same to and from a signalling position, and means for folding and unfolding the hinged sections of the signal element during the swinging movements of the latter, the latter means including a shaft mounted on one of the sections and having an arm connected with the other section, said shaft being provided with spiral grooves, a lever pivoted on and connected by the signal element and having means for engaging said grooves and a relatively fixed cam arranged in the path of and adapted to be engaged by the said lever for rotating the shaft when the signal element is swung on its pivot.

6. An automobile signal of the class described, including a signal element composed of hinged foldable sections, means for pivotally mounting the signal element and for swinging the same to and from a signalling position, and means for folding and unfolding the hinged sections of the signal element during the swinging movements of the latter, the latter means including a shaft mounted on one of the sections and having an arm connected with the other section, said shaft being provided with spiral grooves, a lever pivoted on and connected by the signal element and having means for engaging said grooves and a relatively fixed cam arranged in the path of and adapted to be engaged by the said lever for rotating the shaft in one direction when the signal element is swung on its pivot, and a spring carried by the signal element and engaging the lever for rotating the shaft in the opposite direction.

7. An automobile signal of the class described, including a signal element divided longitudinally to form two sections, said sections being hinged together at their inner longitudinal edges to permit one of the sections to swing transversely and fold against the other section, a pivoted lever carrying the signal element and arranged to swing the same from a non-signalling position to a signalling position, an operating device, means for operatively connecting the operating device with the lever for swinging the signalling device, and means for automatically swinging one of said sections transversely on the other for folding and unfolding the signal element during the swinging movements of the signal element.

8. An automobile signal of the class described, including a signal element composed of foldable relatively movable sections, a pivoted lever carrying the signal element and arranged to swing the same from a non-signalling position to a signalling position, an operating device, means for operatively connecting the operating device with the lever for swinging the signalling device, means for automatically folding and unfolding the signal element during the swinging movements of the signal element, and a covering arranged to receive the signalling element and conceal the same when the signal element is moved to non-signalling position.

9. An automobile signal device of the class described, including a foldable signal element divided longitudinally to form two sections, said sections being hinged at their inner longitudinal edges to permit one of the sections to swing transversely and provided at their inner hinged edges with registering recesses forming an opening when the sections are unfolded, an electric light carried by one of the sections and located at the said recesses and arranged in the said opening when the said sections are unfolded, means for moving the signal element to and from a signalling position, and means for automatically unfolding and folding the sections of the signal element during the movement thereof to and from its signalling position.

10. An automobile signal of the class described including a casing having a spotlight reflector, a pivotally mounted signal element divided longitudinally to form two sections, said sections being hinged together at their inner longitudinal edges to permit one section to swing transversely and having at their inner hinged edges registering recesses forming an opening when the sections are unfolded, an electric light bulb carried by one of the sections and arranged at the said recesses and located in the said opening for illuminating the signal when the sections are unfolded, said signal element being arranged to swing into the casing and to carry the electric light bulb to the spotlight reflector to form a spotlight, operating means for swinging the signal element, and means for swinging one section transversely on the other for folding and unfolding the sections of the signal element during the pivotal movement of the latter.

11. An automobile signal of the class described, including a pivotally mounted signal element divided longitudinally to form two sections, said sections being hinged together at their inner longitudinal edges to permit one section to swing transversely on the other and adapted to fold and unfold when the signal element is swung on its pivot, means for swinging the signal element to carry it to and from a signalling position, a relatively fixed cam, and means carried by the signal element and connected with the sections and arranged to engage and be actuated by the cam for swinging one of the hinged sections transversely of the signal element as the latter is swung on its pivot.

12. An automobile signal of the class described, including a pivotally mounted signal element divided longitudinally to form two sections, said sections being hinged together at their inner longitudinal edges and arranged to fold and unfold during the swinging movement of the signal element on its pivot, a relatively fixed cam, a lever pivotally mounted on one of the sections of the signal element and arranged to be actuated in one direction by the said cam, a spring engaging the lever and swinging the same in the opposite direction, and means actuated by the lever and connected with the other hinged section to swing the latter transversely for opening and closing the signal element when the latter is swung on its pivot.

13. An automobile signal of the class described, including a pivotally mounted signal element divided longitudinally to form two sections, said sections being hinged together at their inner longitudinal edges and arranged to fold and unfold during the swinging movement of the signal element on its pivot, a relatively fixed cam, an approximately T-shaped lever having two substantially aligned arms and a laterally extending arm, means for pivoting one of the aligned arms to one of the sections, a worm shaft journalled on such section and engaged by the other aligned arm of the said lever, a spring bearing against the lever for maintaining the same in engagement with the cam and for moving the lever in the opposite direction to the movement of the lever by the cam when the signal element is swung on its pivot, and means connected with the shaft and with the other section of the signal element for swinging the latter section transversely for opening and closing the signal element when the same is oscillated.

In testimony whereof I have hereunto set my hand.

ALBERT GEORGE MOLNIAR.